(12) United States Patent  (10) Patent No.: US 7,702,123 B2
Soerensen  (45) Date of Patent: Apr. 20, 2010

(54) LOUDSPEAKER ASSEMBLY

(75) Inventor: Bjar Soerensen, Thyholm (DK)

(73) Assignee: Bang & Olufsen A/S, Struer (DK)

( * ) Notice: Subject to any disclaimer, the term of this patent is extended or adjusted under 35 U.S.C. 154(b) by 463 days.

(21) Appl. No.: 10/598,209

(22) PCT Filed: Feb. 20, 2004

(86) PCT No.: PCT/DK2004/000114

§ 371 (c)(1),
(2), (4) Date: Nov. 16, 2006

(87) PCT Pub. No.: WO2005/081520

PCT Pub. Date: Sep. 1, 2005

(65) Prior Publication Data

US 2007/0140508 A1    Jun. 21, 2007

(51) Int. Cl.
*H04R 1/02* (2006.01)
*H04R 25/00* (2006.01)
*G10K 11/00* (2006.01)

(52) U.S. Cl. .................... 381/389; 381/160; 381/387; 181/176

(58) Field of Classification Search .................. 381/86, 381/160, 302, 339, 347, 350, 386, 387, 389, 381/395; 181/176
See application file for complete search history.

(56) References Cited

U.S. PATENT DOCUMENTS

| 2,789,158 | A |   | 4/1957 | Livingston |
| 3,500,953 | A | * | 3/1970 | Lahti ........................... 181/151 |
| 5,031,220 | A | * | 7/1991 | Takagi et al. ................. 381/389 |
| 5,285,501 | A | * | 2/1994 | Castillo ....................... 381/86 |
| 5,321,760 | A |   | 6/1994 | Gray |
| 5,943,430 | A |   | 8/1999 | Saitoh |
| 6,343,135 | B1 |   | 1/2002 | Ellero et al. |
| 6,922,378 | B2 | * | 7/2005 | Shen ....................... 369/30.27 |

FOREIGN PATENT DOCUMENTS

| DE | 195 34 400 A1 | 3/1997 |
| FR | 2 733 382 A1 | 10/1996 |
| GB | 2 267 756 A | 12/1993 |
| JP | 2-183158 A | 7/1990 |

* cited by examiner

*Primary Examiner*—Curtis Kuntz
*Assistant Examiner*—Jesse A Elbin
(74) *Attorney, Agent, or Firm*—David S. Safran; Roberts Mlotkowski Safran & Cole, P.C.

(57) ABSTRACT

A loudspeaker assembly is described which assembly may be moved from a non-exposed to an exposed position by suitable means of which a few are discussed.

The inventive assembly may comprise an acoustic lens and a particularly advantageous application is for use in an automotive hi-fi system. A number of other applications are also described.

12 Claims, 9 Drawing Sheets

LOUDSPEAKER ASSEMBLY

BACKGROUND OF THE INVENTION

1. Field of the Invention

The present invention relates to a loudspeaker assembly and to the use of such an assembly in an automotive sound installation.

2. Description of Related Art

Loudspeaker assemblies are well-known in the art, and within the scope of the present invention, a loudspeaker assembly shall be construed as comprising one or more of the following; one or more loudspeaker units, a cabinet, a chassis, a frame for holding the one or more loudspeaker units and optionally a protective cover for the loudspeaker.

Loudspeaker assemblies, although being well-known in the art, all have the features in common that they are constantly exposed such that when sound is emitted no hindrance occurs which may obstruct or distort the sound distribution from the loudspeakers, and also when not in use, they are exposed.

In the art it is known to provide loudspeakers with moveable parts. One such example is disclosed in WO 03065761 wherein a loudspeaker assembly of a modular configuration is disclosed, and wherein one of the loudspeaker units, namely the tweeter unit, is built as an acoustical lens construction comprising a transducer. The acoustical lens may be tilted or rotated in order to redirect the emitted sound.

SUMMARY OF THE INVENTION

It may, however, be desirable for a number of reasons to be able to hide or protect the loudspeaker assembly such that when they are not in use they are not exposed, and when exposed the loudspeaker assembly may be oriented or directed so that optimum listening conditions for a user are provided. Consequently, it is an object of the present invention to provide a loudspeaker which addresses this need.

This is solved according to the present invention by providing a loudspeaker assembly which is particular in that the loudspeaker may be brought from a first non exposed position and into a second exposed position along an axis of movement, where the loudspeaker assembly comprises a transducer unit, means in the shape of, for example, motor means and optionally a gearbox for moving the loudspeaker from the first position to the second position and vice-versa, and a closure member for covering the loudspeaker in its first position.

In this manner, it is possible to only expose the loudspeaker assembly whenever it is desirable to be able to distribute sound. Hereby, it is achieved that it is possible to hide the loudspeaker units such that they are protected from dust, mechanical influences and the like and, at the same time, make them inconspicuous when the units are not in use which might be advantageous from a designer's point of view in that the usually black net surfaces of the loudspeakers are hidden from view and may, due to the provision of a closure member, be "camouflaged" such that the closure member is identical to the surroundings whereby it is not immediately visible that a loudspeaker assembly is installed.

A comparable arrangement is disclosed in DE 19534400, wherein a loudspeaker unit and a lens may be hidden in a wall and by electromechanical means exposed for use.

By further providing the embodiment of the invention with an acoustic lens, further advantages are obtained. The construction and the advantages of acoustic lenses are described for example, in U.S. Pat. No. 5,615,176, U.S. Pat. No. 6,068, 080 and International Patent Application Publication WO 0187025. The particular advantages of redistributing the acoustic energy through an acoustic lens are that a very well-defined distribution pattern is achieved with negligible distortion of the signal. It is, in this manner, possible to direct the acoustic energy without interference, for example, in the shape of reflections from other surfaces such that the listener will receive a very pure signal i.e. a signal free from unintended distortions, reflections etc. Furthermore, as one of the principles in the acoustic lens as disclosed in the documents mentioned above is that the sound is redirected into a direction substantially perpendicular to the transducer's sound emitting direction and the overall construction height of the acoustic lens is very limited, a complete loudspeaker assembly's construction height comprising both a loudspeaker unit (transducer) and an acoustic lens may be very shallow.

Turning to the actual movement of the loudspeaker assembly, the invention in a further advantageous embodiment provides that the means for moving the loudspeaker and/or the acoustical lens comprises one or more spindles, which spindles in a first end are fastened to the transducer unit and/or the acoustic lens and in the other end is rotatably held for example by means of a bearing and a worm gearbox, such that the worm gear moves the spindles up or down in relation to the surroundings depending on the rotational direction of the worm gear, and thereby, moving the loudspeaker and the acoustic lens between the first and second positions.

In a still further advantageous embodiment of the invention also relating to moving the loudspeaker assembly from the first non-exposed position and into a second exposed position, the means for moving the loudspeaker and/or the acoustical lens comprises one or more rails fastened to the surroundings, and that means are provided on the loudspeaker assembly for sliding along said rails, such that the loudspeaker assembly may be moved between the first and second positions.

As an alternative to the two different embodiments for providing movement of the loudspeaker assembly, the invention in a further advantageous embodiment provides means for moving the loudspeaker where the means comprises one or more moving racks optionally flexible racks fastened to the loudspeaker with corresponding gear wheels, such that by rotating the gear wheels the rack(s) and thereby the loudspeaker will move.

Common for the three different embodiments for moving the loudspeaker and optionally the acoustic lens from the first non-exposed position to the second exposed position is that the overall construction height of the loudspeaker assembly may be maintained as an overall shallow construction. Furthermore, all of the three suggested methods are fairly simple mechanical constructions which in addition to being relatively simple to manufacture also are very reliable in their way of functioning.

In this connection, it should be mentioned that other means for moving the loudspeaker and optionally the acoustic lens from the first to the second position may be contemplated within the scope of the present invention. Such means may comprise manual means where the assembly is pulled up, or the loudspeaker may be provided with two concentric rings between which a thread is arranged such that by rotating one of the rings, the other ring will move in relation to the first ring. By attaching such an arrangement to the loudspeaker assembly, the rotation and, thereby, the relative movement of the two rings will displace the loudspeaker assembly correspondingly. Also a system where one end of the wire is attached to the bottom section of the assembly such that by pulling in the wire via a number of pulleys, the loudspeaker assembly may be elevated or lowered. Actuators, for example electrically powered actuators, of a telescopic configuration may also be contemplated in order to move the loudspeaker assembly and in particular the loudspeaker and the optionally arranged acoustic lens from the first to the second position.

In a further advantageous embodiment of the invention, the assembly is arranged in a vehicle, preferably in the dashboard and/or the doors and/or the rear shelf. Traditional automotive sound systems comprise a number of loudspeakers built into different parts of the interior of the vehicle. Especially, when an acoustic lens is to be arranged in combination with the loudspeaker assembly according to the invention, this acoustic lens would be projecting outside the contour of the vehicle part into which the loudspeaker was to be built into. For design reasons, this may be undesirable and also for safety reasons, it might be undesirable or directly illegal in that the lens structure may cause a safety hazard in that sharp edges and the like can damage persons coming into contact with these, for example, in the case of an accident. Furthermore, by having the loudspeaker assembly projecting outside the contour, the assembly itself may also be prone to damage if they were permanently exposed in that persons moving in or out of the vehicle might accidentally push, pull or in any other way exert forces on the loudspeaker assembly which may have a detrimental effect on this. It is, therefore, especially for automotive applications advantageous that it is possible to move the loudspeaker assembly into a non-exposed position for example when the sound system is turned off, for example, in connection with parking the vehicle or shutting off the engine.

Taking advantage of the lens technology is especially advantageous inside the vehicle in that distortions and unintended reflections from the vehicle surfaces might be severely limited in that the well-defined distribution pattern of the acoustic energy through the acoustic lens is very well-defined, it is possible to direct the acoustic energy i.e. the sound substantially unimpeded to the listener.

In a further advantageous embodiment, the surroundings are the dashboard of a vehicle, and the closure member is integral with a top section of the loudspeaker assembly, and that the closure member is a cut-out section of the dashboard or at least made from the same materials and having identical texture as the dashboard, such that the assembly is invisible in its first position and fully operational in its second position.

In this manner, it is possible to hide the loudspeaker installation inside the dashboard when the sound installation is not in use. As the sound installation is activated, a signal may be sent to the loudspeaker assembly such that the means for moving the loudspeaker assembly from the first non-exposed position to the second exposed position is activated. As the sound installation is turned off, a similar signal may be sent to the loudspeaker assembly such that the loudspeaker and optionally the acoustic lens are moved from the second position to the first position. By furthermore providing that the closure member is of an identical material as that of the surrounding dashboard and furthermore, design the movement of the loudspeaker assembly such that in its hidden position, i.e. when the loudspeaker assembly in its first non-exposed position, the closure member is arranged integral with the loudspeaker assembly and for example, on top of this will be at the same level as the top of the dashboard such that it is practically indistinguishable that a loudspeaker assembly according to the invention is hidden in the dashboard.

In a further advantageous embodiment, the assembly is built into a wall, for example the wall of a vehicle door, the wall of a building or the like, and that the closure member is a moveable section of the wall, which when the movement of the loudspeaker assembly is activated retracts, slides, pivots or in any other way moves concurrently with the movement of the loudspeaker assembly from the first position to the second position and vice-versa. By applying these principles to sound installations in general, for example, as mentioned above, new design possibilities especially for the interior design of living areas, cars, trains, aircrafts and the like have been provided. The movement may for example be a 180° turn from hidden to exposed and vice versa around an axis parallel to the plane of the wall.

In a further advantageous embodiment, the inventive principle may be arranged such that the surroundings are a television set, a hi-fi sound installation or another loudspeaker or subwoofer. For every day use, it might be desirable that for example a television set does not have protruding loudspeakers but in use where the television set goes from having a passive perhaps decorative role in the surroundings to a more active role where focus is on the screen and not on the design of the television set, it might be more acceptable that extra loudspeakers projects from such a set. Especially, if the provision of extra loudspeakers, for example, comprising an acoustic lens will greatly improve the sound side of the transmission and, thereby, improve the user's overall experience. For the same reasons, it might also be desirable to arrange such loudspeaker assemblies in hi-fi sound installations such as so-called ghetto blasters, flat screen TVs (LCD/plasma/OLED), signal receivers, DVD/CD players, amplifiers, laptops, PCs, or other transportable sound equipment.

In order to protect the loudspeaker assembly, the invention in a further advantageous embodiment provides that pressure sensors are provided in the assembly such that if a predetermined minimum force is applied to the assembly in its second position, the assembly will retract to its first position. The sensors may be provided in order to provide the loudspeaker assembly with a security such that if any predefined minimum force or impact is applied to the loudspeaker assembly, it will retract into its hidden position which will also be a protective position. It may also be that the loudspeaker assembly is provided with the sensors in order to minimize the risk of inflicting damage for example, when the loudspeaker assembly is installed in a dashboard, it might be desirable to be able to retract the loudspeakers very quickly such that persons or body parts do not come into accidental contact with the loudspeaker assembly for example in case of an accident. Similar sensors used in order to activate air-bags may be used in order to retract the assembly according to the present invention.

Sensors which are suitable for collecting the desired information are widely available in the art, and within the scope of the present invention, any type of sensor for detecting mechanical impact may be used with the present invention.

For some applications, it is desirable to have further possibilities of directing the sound. For this purpose, the loudspeaker assembly is arranged such that the loudspeaker and/or the acoustic lens may be rotated around the axis of movement and further may optionally be tilted around a second axis perpendicular to the axis of movement. Appropriate means for facilitating these movements may be selected according to circumstances. The acoustic lens described with reference to the documents above has a vertical angle of dispersion of sound energy which may be designed to be approximately 30 degrees. Therefore, by being able to rotate the acoustic lens or the loudspeaker around a second axis, it is possible to direct the sound energy as optimally as possible towards the listener.

Also by providing rotation around the axis of movement, it might also be possible to direct the sound energy with a minimum of distortion and reflections to a listener.

Furthermore, the rotation and tilting action of the loudspeaker assembly according to the invention my be carried out in response to instructions received from a computer wherein input from information about the position of the listener and/or the configuration of the room and/or pieces of furniture etc. may give the instructions to the loudspeaker assembly on how to tilt, move or in any other way bring the loudspeaker assembly into the most optimal sound energy transmitting position according to the present circumstances.

The invention further comprises the application of a loudspeaker assembly as described above installed in an automotive sound installation comprising a number of loudspeakers such as tweeters, midrange, bass, mid-bass and subwoofer and at least one loudspeaker assembly as described above wherein the sound distribution is controlled by a central unit, and that means are provided for optimising the distribution of sound between the loudspeakers in relation to the passengers in the vehicle, wherein the loudspeaker assembly is arranged in the dashboard of the vehicle, and that the loudspeaker assembly may automatically and optionally independently be adjusted for rotation, tilt and/or elevation for optimal sound distribution. Tests have shown that especially high quality of sound production may be achieved with an installation as mentioned above where the sound production for listeners inside a vehicle is greatly improved in comparison to ordinary automotive sound installations.

The invention will now be described with reference to the accompanying drawing, in which:

BRIEF DESCRIPTION OF THE DRAWINGS

FIG. 15 illustrates a diagram of an automotive sound installation.

DETAILED DESCRIPTION OF THE INVENTION

Figure 1:
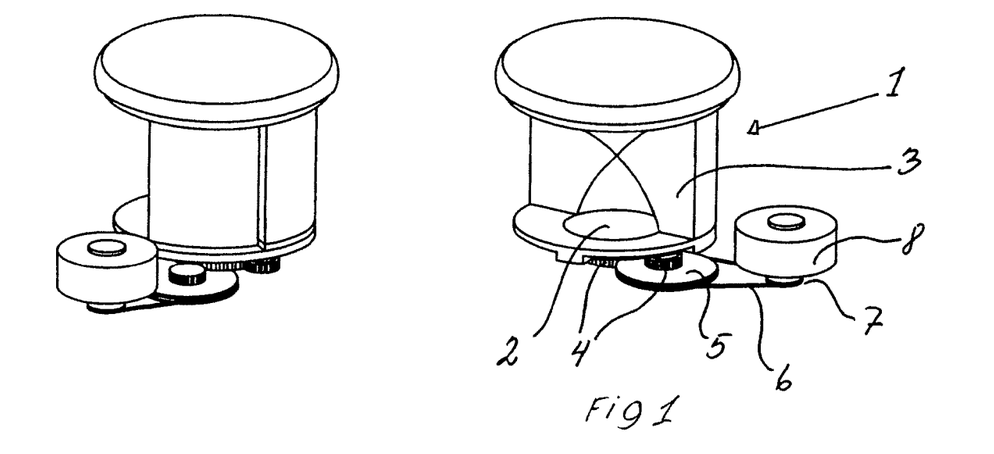
FIG. 1 illustrates a tweeter comprising an acoustic lens and means for moving the assembly.

In FIG. 1, a loudspeaker assembly according to the invention is illustrated where the assembly in this example is a tweeter built into an acoustic lens. The tweeter 1 is built up of a loudspeaker unit 2, an acoustic lens 3 and means in the shape of gear wheels 4, pulleys 5 and a wire 6 such that by rotating the pulley 7 connected to the motor 8, the acoustic lens 3 and the loudspeaker unit 2 will be rotated clockwise or counter-clockwise depending on the direction of the motor and the construction of the gear wheels 4. The gear wheels 4 can alternatively be coupled to a spindle comprising a worm gear as illustrated with reference to FIG. 2.

Figure 2:
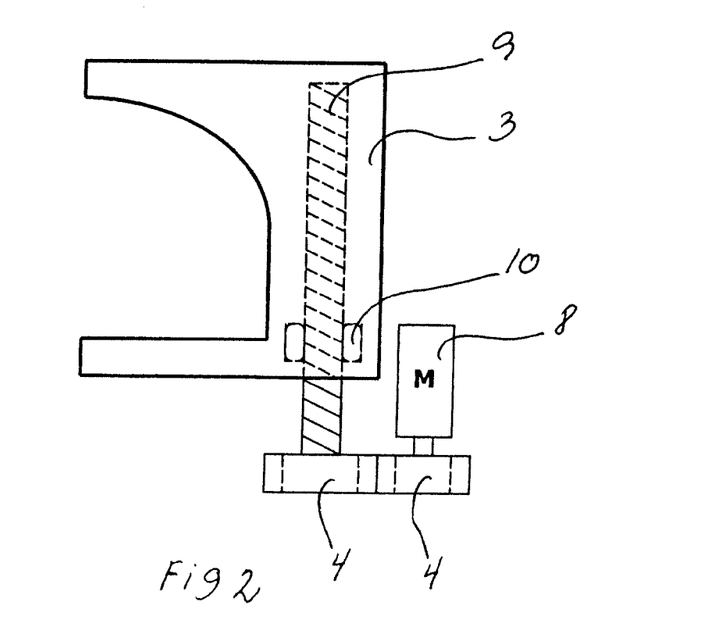
FIG. 2 is a schematic illustration of moving means.

In FIG. 2, the acoustic lens 3 is schematically illustrated, and the loudspeaker unit 2 integrated in the acoustic lens is not illustrated. The spindle 9 is arranged such that by activating the motor 8, the gear wheels 4 will interact in order to rotate the spindle 9 whereby a nut 10 arranged in the acoustic lens around the spindle will push the acoustic lens 3 upwards or downwards depending on the rotational direction of the gear wheels 4 driven by the motor 8. In this manner, it is possible to transport the acoustic lens along the longitudinal axis of the spindle 9.

Figure 3:
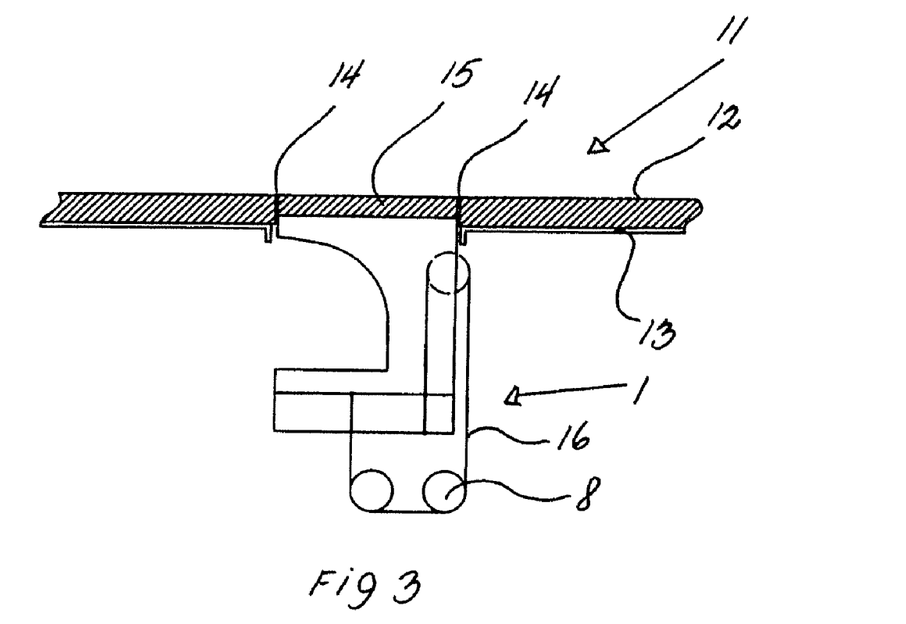
FIG. 3 illustrates alternative moving means and assembly in non-exposed position.
Figure 4:
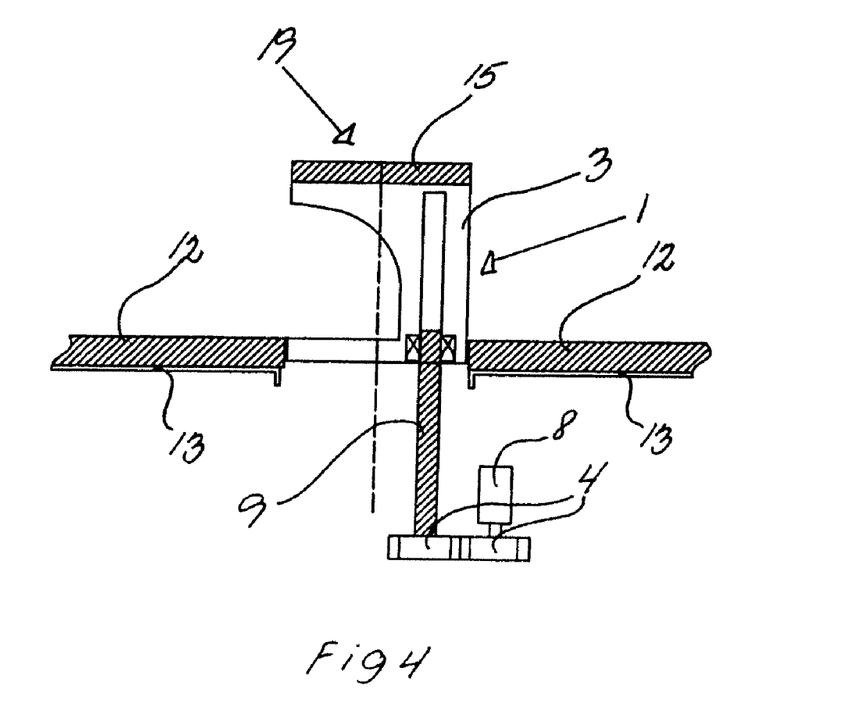
FIG. 4 illustrates alternative moving means and assembly in exposed position.

In FIGS. 3 and 4, an acoustic lens in its first non-exposed position and its second exposed position is illustrated. For illustration purposes only, the means for bringing the loudspeaker assembly according to the present invention from its first to its second position, is different, illustrating that any suitable means for providing the movement may be applied.

In FIG. 3, a dashboard surface 11 is illustrated usually comprising a resilient layer 12 and a construction 13 such as a steel member provided in order to support the dashboard. Integral with the dashboard, there is a loudspeaker assembly 1 according to the invention. The loudspeaker assembly illustrated in FIG. 3 is in a first non-exposed position such that it is not possible apart from the gaps 14 to detect the presence of a loudspeaker assembly in the dashboard. The closure member 15 is in this embodiment made from the same material as the resilient layer of the dashboard 12 such that to an observer no noticeable difference will be detected between the regular dashboard surface and the closure member's surface.

The loudspeaker assembly 1 may be powered into the second exposed position by activating the motor means 8 whereby the wire 16 is being pulled, and depending on the direction of pulling, the loudspeaker assembly may either be elevated into the second exposed position or retracted into the first non-exposed position.

The illustration in FIG. 3 illustrates the first non-exposed position.

In FIG. 4, however, the second exposed position is illustrated. The same reference numbers are used for the same features throughout the application such that the elevation of the loudspeaker assembly 1 exposes the acoustic lens 3 in this embodiment by activating the motor 8 whereby gear wheels 4 will make the spindle 9 rotate as explained with reference to FIG. 2.

Figure 5:
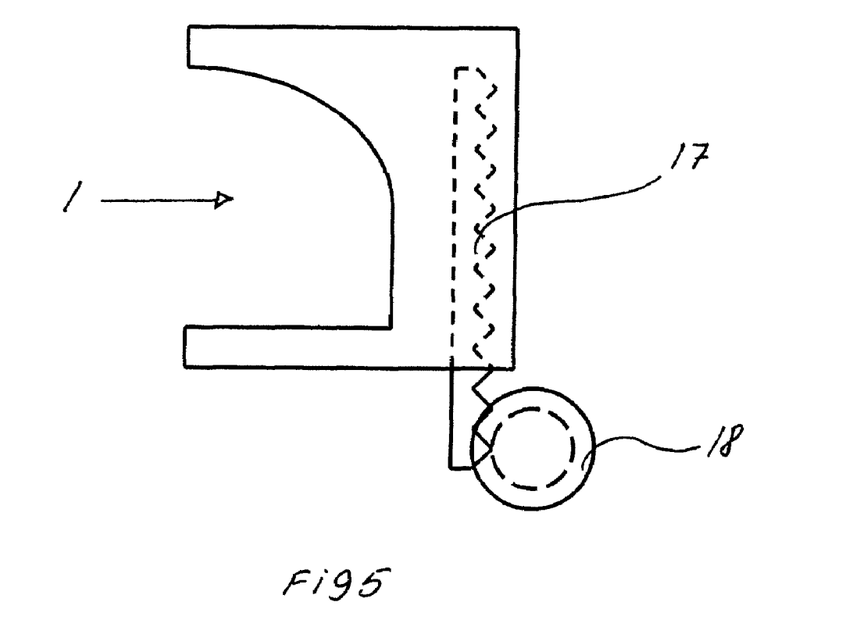
FIG. 5 illustrates alternative moving means and assembly in exposed position.
Figure 6:
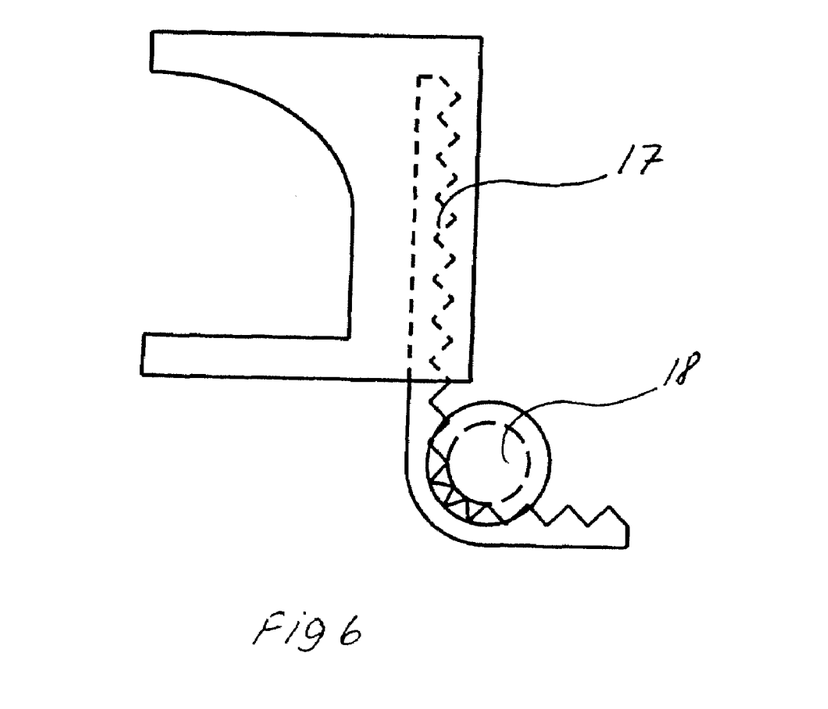
FIG. 6 illustrates alternative moving means and assembly in exposed position.

In addition to the illustrated examples of how to manipulate the loudspeaker assembly 1 from its first non-exposed position to the second exposed position, different means were illustrated in FIGS. 2, 3 and 4. Additional means may as illustrated in FIGS. 5 and 6 be a principle of providing a moving rack in cooperation with a gear wheel 18. By rotating the gear wheel, the moving rack 17 and, thereby, the attached loudspeaker assembly 1 will move up or down. In FIG. 6, an embodiment is illustrated where the moving rack 17 is flexible such that it is possible to minimize the total building height of the loudspeaker assembly if this is desirable. Using the flexible rack takes up more space in the width direction in comparison to a linear diffusion rack. The skilled scope person will choose one or the other according to the circumstances.

Any other suitable means for moving the assembly up and/or down may be used, such as for example a concertino mechanism, comprising a scissors arrangement, whereby elevation is achieved by moving the ends of the scissors' arms together and retraction is achieved by moving the arms apart. Also arranging the assembly in a parallelogram structure, such that the assembly fastened in one corner of the parallelogram will move in a linear manner when the shape of the parallelogram is altered, for example by influence of an actuator fastened to an appropriate part of the construction.

Figure 7:
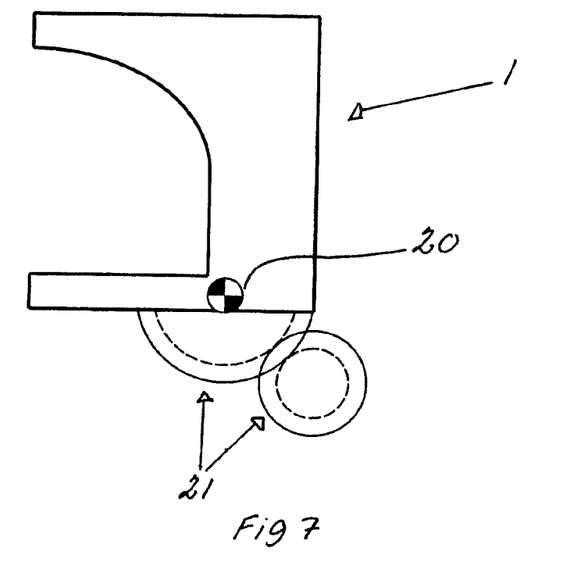
FIG. 7 is a schematic illustration of pivot means.

For some applications, it might be desirable to be able to tilt the loudspeaker assembly 1 around an axis 20 perpendicular to the axis 19 along which the loudspeaker assembly 1 moves when it is travelling from the first non-exposed position to the second exposed position as illustrated with reference to FIGS. 3 and 4. For this purpose, a secondary set of gear wheels 21 as illustrated in FIG. 7 may be provided for controlling the tilt around the axis 20.

Figure 8:
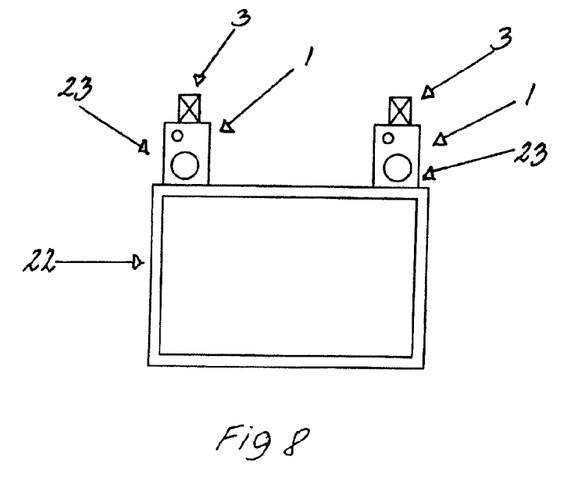
FIGS. 8,9 are a schematic principle of the invention applied to a traditional TV set, FIG. 10 *a-d* are a schematic principle of the invention applied to a flat screen TV, FIG. 11 *a*) & *b*) same as FIG. 10, FIG. 12 *a*) & *b*) illustrate a traditional loudspeaker with the inventive principle, FIG. 13 *a*) & *b*) illustrate the pivotal principle for the loudspeaker assembly.
Figure 9:
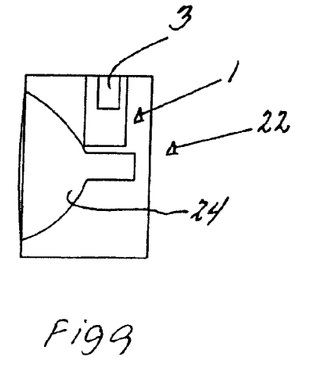

The inventive principle of hiding a loudspeaker assembly as explained above may be used in a number of applications. With reference to FIGS. 8 and 9, a television set 22 is illustrated. In FIG. 8, a frontal view of the television set comprising two loudspeaker assemblies 1 according to the invention is illustrated. The loudspeaker assemblies 1 are in their second exposed position such that it is possible to listen to any sound emission deriving from the television. In this embodiment, the loudspeaker assembly comprises a normal loudspeaker unit 23 into which an acoustic lens 3 is built. The acoustic lens may in a further advantageous embodiment be movable according to the same principles as discussed above with relation to the loudspeaker unit 23 such that a two stages movement becomes possible, namely, first that the loudspeaker 23 is elevated from the television set, and, thereafter, the acoustic lens is elevated from the loudspeaker unit 23.

In FIG. 9, a cross-section through a television is illustrated where the loudspeaker assembly according to the invention is illustrated as being in position behind the picture 24.

Figure 10:
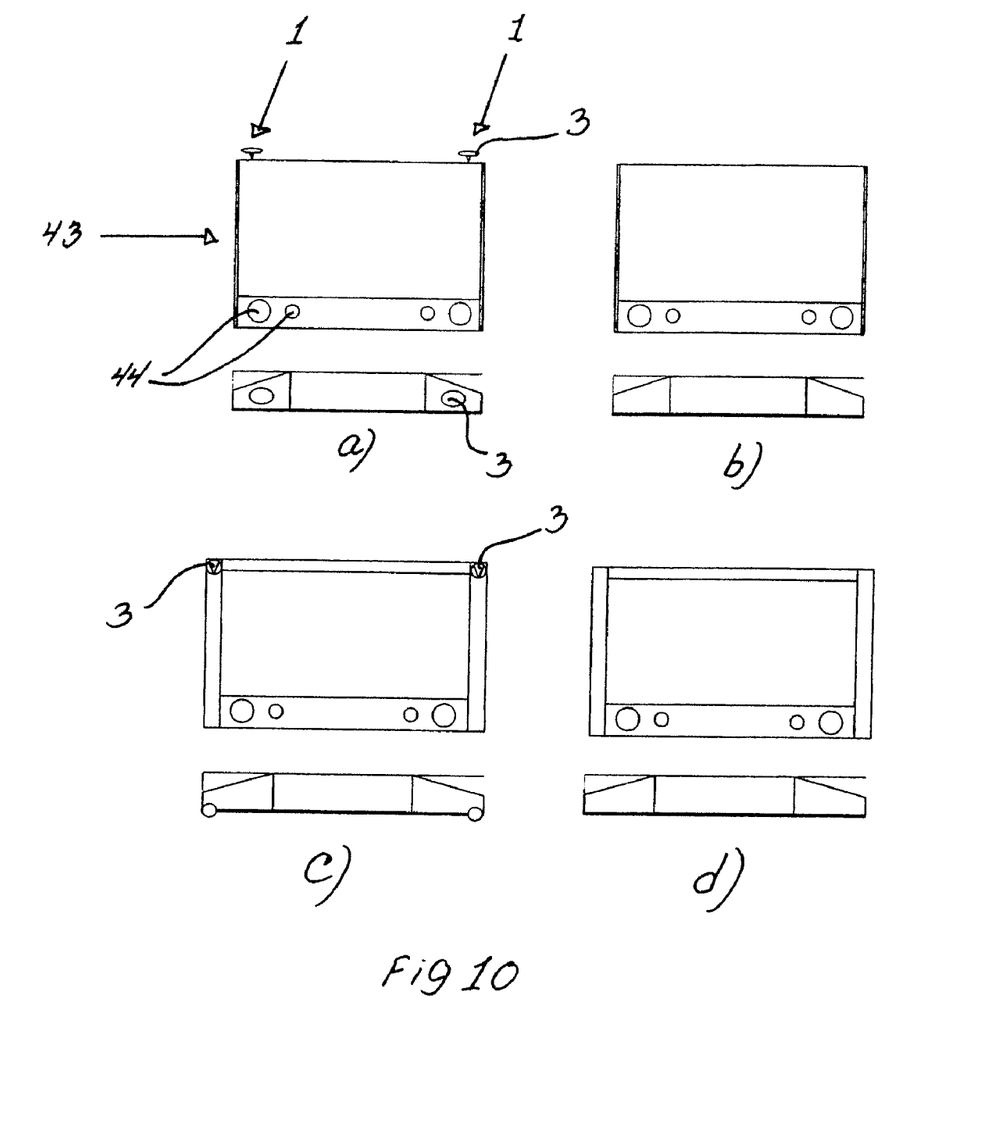

Of particular interest is the provision of the inventive loudspeaker assembly as provided with the present invention for the so-called flat screen television sets. In FIG. 10a) through d) different possibilities of building the assembly and in particular the moveable acoustic lens into such a device are illustrated. In FIG. 10a), an embodiment is illustrated where the loudspeaker assembly 1 is built into a flat screen television set 43. In this particular embodiment, illustrated in FIG. 10a)-d), the assembly is made as a two part device where the tweeter is built into an acoustic lens 3 and arranged in the top part of the flat television screen 43. The other speakers being mid range and bass 44 are arranged as built-in speakers elsewhere in the device.

In FIG. 10b), the flat television screen 43 is illustrated with the acoustic lens 3 in the withdrawn position where it is not visible from the front of the television screen.

In FIGS. 10c) and d), a similar configuration is illustrated where the tweeter comprises an acoustic lens where in the illustrated example, the acoustic lens is arranged in a top part of the screen, but it may be arranged anywhere suitable on the flat screen installation. In this embodiment, the tweeter with the acoustic lens 3 is arranged in a rotatable manner such that the acoustic lens may be rotated from a hidden position as illustrated in FIG. 10d) into a visible position as illustrated in FIG. 10c).

Figure 11A:
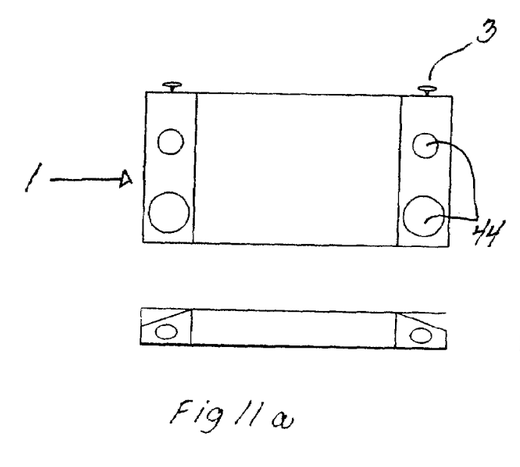
Figure 11B:
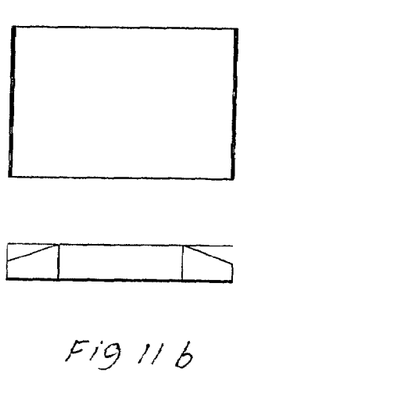

In a further advantageous embodiment, as illustrated in FIGS. 11a) and b), a television set 43 is illustrated with a built-in loudspeaker assembly according to the present invention. The loudspeaker assembly 1 may be fully visible as illustrated in FIG. 11a) or may be moved into a hidden position for example by sliding or by rotation as illustrated in FIG. 11b). The loudspeaker assembly may comprise mid range and bass speakers 44 and a tweeter unit comprising an acoustic lens 3.

Figure 12A:
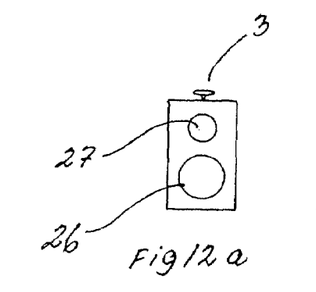
Figure 12B:
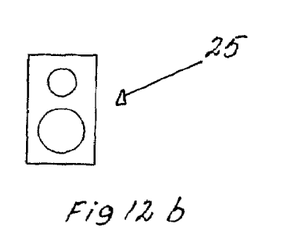

In FIGS. 12a) and b), a traditional loudspeaker unit 25 is illustrated comprising, for example, a bass speaker 26, a mid-range speaker 27 and a tweeter comprising an acoustic lens 3. In FIG. 12b), is illustrated the configuration where the acoustic lens 3 is in its first non-exposed position whereas in FIG. 12a), the same loudspeaker is illustrated where the acoustic lens 3 in the second exposed position in relation to the loudspeaker 25. The principles relating to moving the acoustic lens or the loudspeaker assembly 23 as mentioned above with reference to FIGS. 8 and 9 may be any suitable means among which the embodiments for movement as described above also are comprised.

Figure 13A:
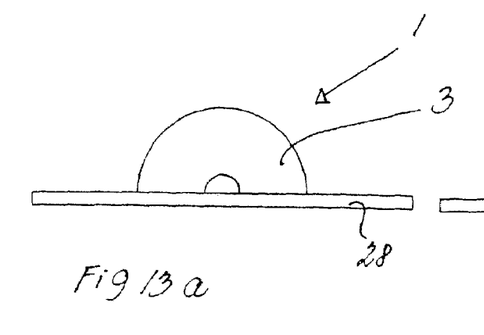
Figure 13B:
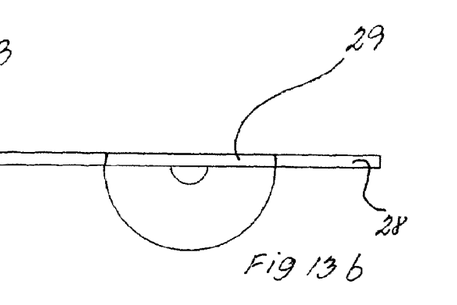

In FIGS. 13a) and 13b), an embodiment is illustrated where a loudspeaker assembly 1 is built into a wall 28. In FIG. 13a), the loudspeaker assembly 1 is illustrated in its second exposed position and in FIG. 13b), only the closure member 29 of the loudspeaker assembly according to the invention is visible. Depending on the texture configuration and overall design of the wall 28, the built-in loudspeaker assembly according to the invention may be more or less visible. In the illustrated embodiment, it is illustrated that the loudspeaker assembly rotates about an axis parallel to the wall, but also other means for performing the movement may be contemplated such as for example sliding on rails etc.

Figure 14:
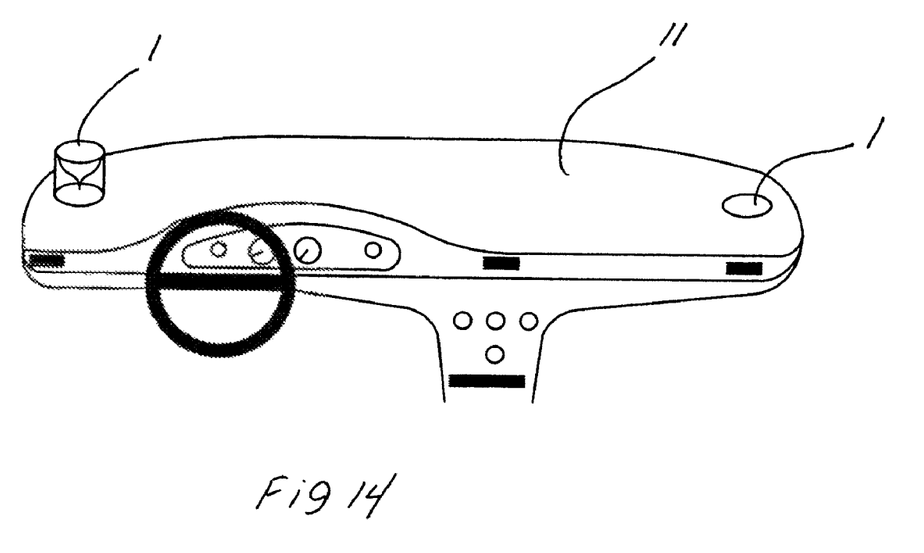
FIG. 14 illustrates a dashboard with a built-in loudspeaker assembly.

In FIG. 14, again a dashboard 11 is illustrated as was the case with reference to FIGS. 3 and 4. In this embodiment, however, the positioning of two loudspeaker assemblies 1 is particular in that both speakers are tweeters in a sound installation. These may advantageously be built-in in opposite sides of the dashboard as illustrated in FIG. 14. Just for illustration purposes, the left-hand loudspeaker assembly in the dashboard illustrated is in its second exposed position and the right hand loudspeaker assembly 1 is in its non-exposed position.

For all the embodiments described with reference to any of the figures, the loudspeaker assembly may advantageously be equipped with a impact sensing system such that if the loudspeaker assembly detects an impact for example in the shape of a hand or other body part being placed or hit upon the loudspeaker assembly 1, it may automatically and optionally very quickly retract into the first non-exposed position, thereby, protecting both the loudspeaker assembly according to the invention, but also the body part. This is especially important for applications in automotives where the exposed loudspeaker assembly as illustrated with reference to FIG. 14 might be an extra source of possible injury to a passenger in the vehicle in case of an accident. It is, therefore, desirable that the loudspeaker assembly retracts into the first non-exposed position in case of emergency breaking and/or activation of the airbags and/or due to any other impact above a certain minimum impact level. In addition to or alone, a single assembly according to the invention may be provided centrally in the dashboard.

Especially for automotive installations, the present invention is advantageous in that its non-active state, it does not have to be exposed and, thereby, be part of the interior design of the vehicle. An example of such an automotive sound installation is illustrated with reference to FIG. 15. In the rear booth or in a body cavity of the vehicle, the electronic equipment for amplifying and filtering the sound 30 is hidden. From here, cabling is built in suitable cavities in the automotive body to the positions where it is desirable to arrange the loudspeakers. In this instance, a sub-woofer 31 has been arranged behind the rear seat and symmetrically above a centre line of the vehicle, mid-range speakers 32 are arranged adjacent to the subwoofer. In the rear doors 33, a combined mid-bass and mid-range speakers 34 and 25 mm. tweeter units 35 arranged. The tweeter units may be traditional tweeter units built into the door of the vehicle or may be units according to the invention where the tweeters will be arranged with means for moving the tweeter unit from a first non-exposed position to a second exposed position depending on the choices of the sound installation constructor. In the front doors 36, bass units 37 and mid-range units 38 are arranged. An additional mid-range unit 39 is arranged in the centre of the dashboard 11. Also in the dashboard, two loudspeaker assemblies 40 according to the invention and as described in detail above are arranged.

The units 31, 32, 34, 37, 38, 39 and 40 may advantageously be constructed as first pressure tied units such that any influence from their surroundings may be eliminated or at least minimized.

In order to further compensate for wind noise, road noise, noise from the interior of the vehicle etc. a set of microphones 41 may be installed centrally in the vehicle in order to detect outside sources of sound energy which may be compensated in the amplifying units and filters by suitable adjustment means. Also further additional wires 42 may be provided in order to control the movement of the built-in loudspeaker assembly according to the invention such that the loudspeaker assembly 40 may be brought from its first non-exposed position to its second exposed position. In embodiments where the tweeters 35 also are configured for movement, this movement may be correlated with the movements of the front tweeters 40.

Figure 16:
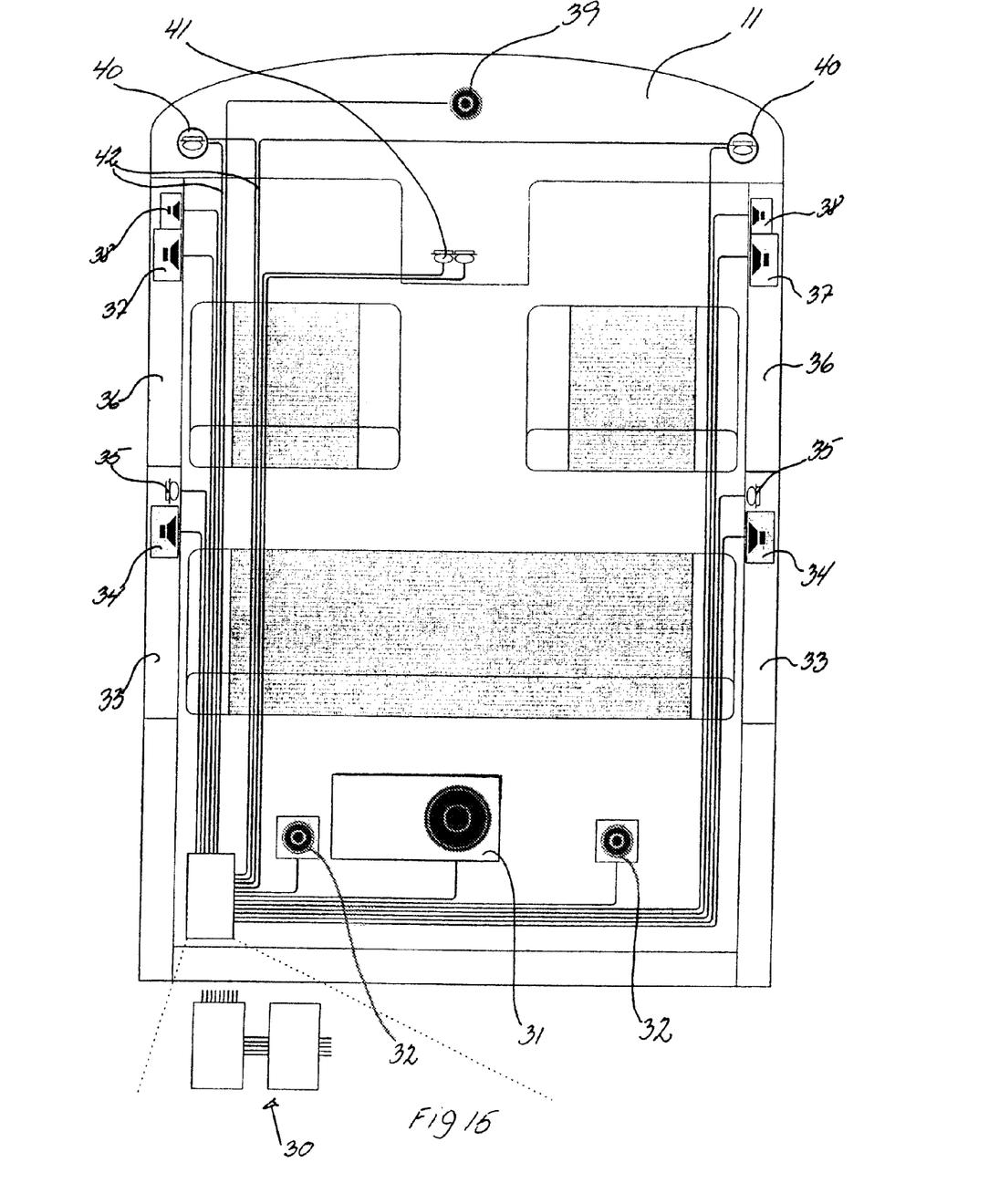
FIG. 16 is a schematic depiction of an embodiment in which the loudspeaker assembly is controlled in three different manners.

FIG. 16 illustrates an embodiment in which the loudspeaker assembly may be controlled in three different ways, e.g., elevated up and down, rotated and tilted.

Here, the acoustic lens 50 is arranged in front of a transducer unit, e.g., a tweeter 51. The acoustic lens 50 and the tweeter 51 are arranged in an aperture in a plate member 52, which is flush with, for example, the dashboard 53 of a vehicle. The tweeter and acoustic lens are mounted on an axle 55 which is movable up and down by a first motor 56. The first motor 56 is fixed relative to the chassis or cabinet 54 by fixation means 58. Connected to the fixation means 58, is a second motor 57, which engages the axle in order to rotate said axle. By controlling the second motor it is thereby possible to control the direction into which the acoustic lens emits sound.

Figure 17:
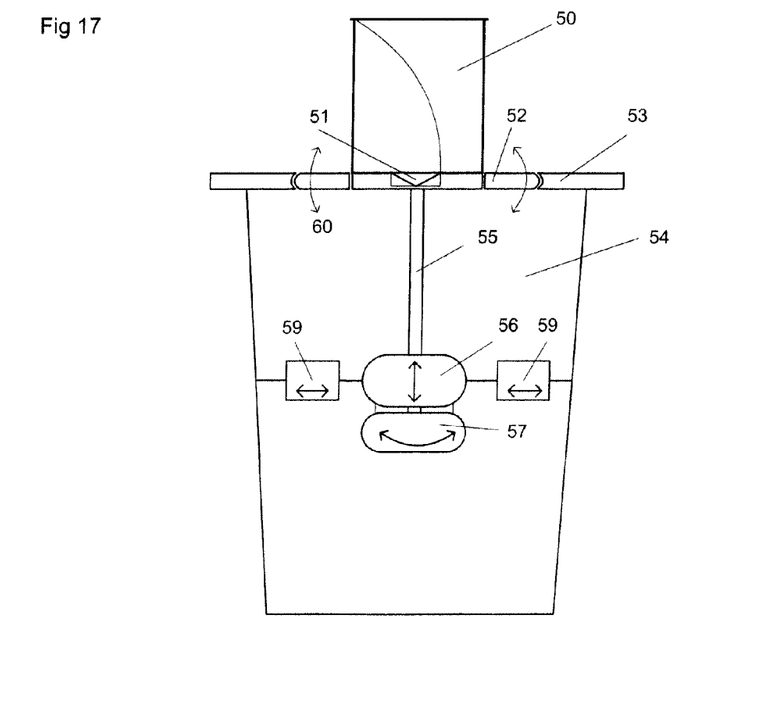
FIG. 17 is a schematic depiction of an embodiment in which the loudspeaker assembly is provided with additional motors.

FIG. 17 illustrates a further embodiment in which a third drive 59 (represented by two motors in the figure, but only one motor may be used) is provided. The third drive may pull/push the axle 55, whereby the plate member 52 will pivot/tilt as indicated by the arrows 60.

What is claimed is:

1. Loudspeaker assembly arranged in a surrounding surface, wherein the loudspeaker, including an acoustic lens joined therewith, is capable of being brought from a first non-exposed position and into a second exposed position along an axis of movement, where the loudspeaker assembly comprises a transducer unit, means for moving the loudspeaker in a linear movement from the first position to the second position and from the second position to the first position and a closure member either being integral with the loudspeaker assembly or being an integral part of the acoustic lens for covering the loudspeaker in its first position, and further that means are provided so that the loudspeaker and/or the acoustic lens may be rotated around the axis of movement, and further a means for tilting the loudspeaker and/or the acoustic lens around a second axis perpendicular to the axis of movement is provided.

2. Loudspeaker assembly according to claim 1, wherein the means for moving the loudspeaker and the acoustical lens comprises one or more spindles which spindles, in a first end, are fastened to the transducer unit and/or the acoustic lens and in the other end are rotatably held by means of a bearing and a worm gearbox, such that the worm gear moves the spindles up or down in relation to the surroundings depending on the rotational direction of the worm gear thereby moving the loudspeaker and the acoustic lens between the first and second positions.

3. Loudspeaker assembly according to claim 1, wherein the means for moving the loudspeaker and/or the acoustical lens comprises one or more rails fastened to the surroundings, and wherein means are provided on the loudspeaker assembly for sliding along said rails, such that the loudspeaker assembly is movable between the first and second positions.

4. Loudspeaker assembly according to claim 1, wherein the means for moving the loudspeaker and/or the acoustical lens comprises one or more moving racks fastened to the loudspeaker with corresponding gearwheels, such that, by rotating the gearwheels, the rack(s) and thereby the loudspeaker will move.

5. Loudspeaker assembly according to claim 1, wherein the assembly is arranged in a vehicle, preferably in the dashboard, and/or doors, and/or the rear shelf.

6. Loudspeaker assembly according to claim 1, wherein the surrounding surface is the dashboard of a vehicle, and that the closure member is integral with a top section of the loudspeaker assembly and that the closure member is a cut-out section of the dashboard or at least made from the same materials and having identical texture as the dashboard, such that the assembly is invisible in its first position and fully operational in its second position.

7. Loudspeaker assembly according to claim 1, wherein the assembly is built into a wall, and wherein the closure member is a moveable section of the wall, which when the movement of the loudspeaker assembly is activated retracts, slides, pivots or moves concurrently with the movement of the loudspeaker assembly from the first position to the second position and vice-versa.

8. Loudspeaker assembly according to claim 1, wherein the surroundings are a television set, a hi-fi sound installation, or another loudspeaker or subwoofer.

9. Loudspeaker assembly according to claim 1, wherein pressure sensors are provided in the assembly such that, if a predetermined minimum force is applied to the assembly in its second position, the assembly will retract to its first position.

10. The loudspeaker assembly according to claim 1, wherein the means for moving the loudspeaker in a linear movement is motor means and a gearbox.

11. Automotive sound installation comprising a number of loudspeakers and at least one loudspeaker assembly according to claim 1, wherein the sound distribution is controlled by a central unit, wherein means are provided for optimising the distribution of sound between the loudspeakers in relation to the passengers in the vehicle, wherein the loudspeaker assembly is arranged in the dashboard of the vehicle, and wherein the loudspeaker assembly is adjustable or rotation, tilt and/or elevation for optimal sound distribution.

12. Automotive sound installation according to claim 11, wherein the adjustment for rotation, tilt and/or elevation for optimal sound distribution is carried out automatically and/or independently.

* * * * *

UNITED STATES PATENT AND TRADEMARK OFFICE
CERTIFICATE OF CORRECTION

PATENT NO. : 7,702,123 B2  Page 1 of 1
APPLICATION NO. : 10/598209
DATED : April 20, 2010
INVENTOR(S) : Bjarne Soerensen It is certified that error appears in the above-identified patent and that said Letters Patent is hereby corrected as shown below:

On the title page item (75), should read as follows:
Bjarne Soerensen

Signed and Sealed this

Third Day of August, 2010

David J. Kappos
*Director of the United States Patent and Trademark Office*